Feb. 7, 1961 H. A. BLEAM 2,971,158
DELAY LINE CIRCUITS
Filed Oct. 3, 1956 3 Sheets-Sheet 1

INVENTOR.
Howard A. Bleam
BY Donald W. Phillio
HIS ATTORNEY

United States Patent Office 2,971,158
Patented Feb. 7, 1961

2,971,158
DELAY LINE CIRCUITS

Howard A. Bleam, Chicago, Ill., assignor to Admiral Corporation, Chicago, Ill., a corporation of Delaware Filed Oct. 3, 1956, Ser. No. 613,642

4 Claims. (Cl. 328—62)

This invention relates generally to delay lines, and more particularly to delay lines which will produce, in response to a single input pulse, two output pulses whose delay times bear an inverse relationship to each other.

Under certain conditions, it is desirable to establish a particular phase relationship between signals supplied to two equipments. For example, for testing or calibrating pulse train generators, which are triggered by a single pulse, it may be desirable to compare the unknown characteristics of one generator with the known characteristics of another generator. Such testing or calibration can often be facilitated by superpositioning the waveforms of the output signals of the generator to be tested and the test generator on the screen of an oscilloscope. However, because the delay times inherent in the two equipments may vary, it is sometimes difficult to obtain good superpositioning. A solution to this problem is to provide compensating means, which will introduce into one or the other of the trigger pulse (supplied from a common source), a time delay which will compensate for the difference in the inherent time delays of the two generators. Since it is often impossible to tell which of the two generators has the longer inherent time delay, the compensating means must be capable of introducing the compensating delay into either the trigger pulse supplied to the generator to be tested or to the test generator. Further, the compensating means should be capable of providing a continuously variable delay.

In a more general sense, it can be stated fairly that there is a need for a reliable and inexpensive time delay apparatus capable of producing from a single pulse, two pulses whose phase relationship can be varied continuously over a substantial range.

An object of the present invention is to provide such a time delay apparatus.

Another object of the invention is to provide a delay line means for producing from a single input signal two output signals each having a time delay which can be varied continuously and in an inverse relationship with each other.

A further aim of the invention is to provide a substantially continuously variable delay line means for producing from a single input signal, two output signals each of which can be delayed a greater or a lesser time than the other, and whose delay times vary inversely with respect to each other.

Another purpose of the invention is the improvement of delay lines, generally.

In accordance with the invention, there is provided a delay line with an input winding or coil inductively coupled to a small portion thereof. Means are provided to move said input coil along said delay line. Input pulses supplied to said input coil will, by inductive means, produce signals in said delay line which will travel, from the point on the delay line to which the input coil is coupled, in both directions towards the ends of the delay line. The amount of delay introduced in these two signals will be determined by the position of the input winding along the delay line and will vary in an inverse manner. Load means for utilizing these two pulses are connected to the ends of the delay line.

In accordance with features of the invention, the delay line may be of various types. As examples, the delay line may be of the electromagnetic type, employing either a continuously wound arrangement or a lumped constant arrangement, or it may be of the magnetostrictive type.

These and other objects and features of the invention will be more fully understood from the following detailed description thereof when read in conjunction with the drawings, in which.

Figure 4:
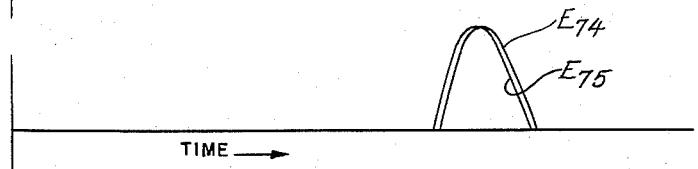
Figure 5:
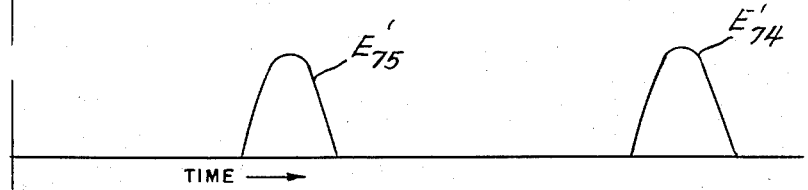
Figure 6:
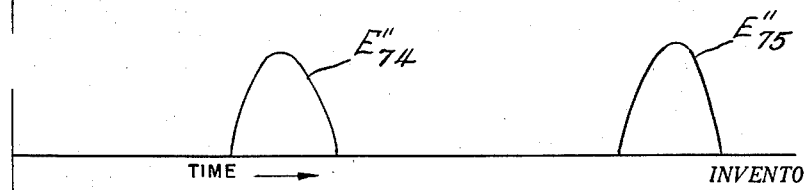
Figure 7:
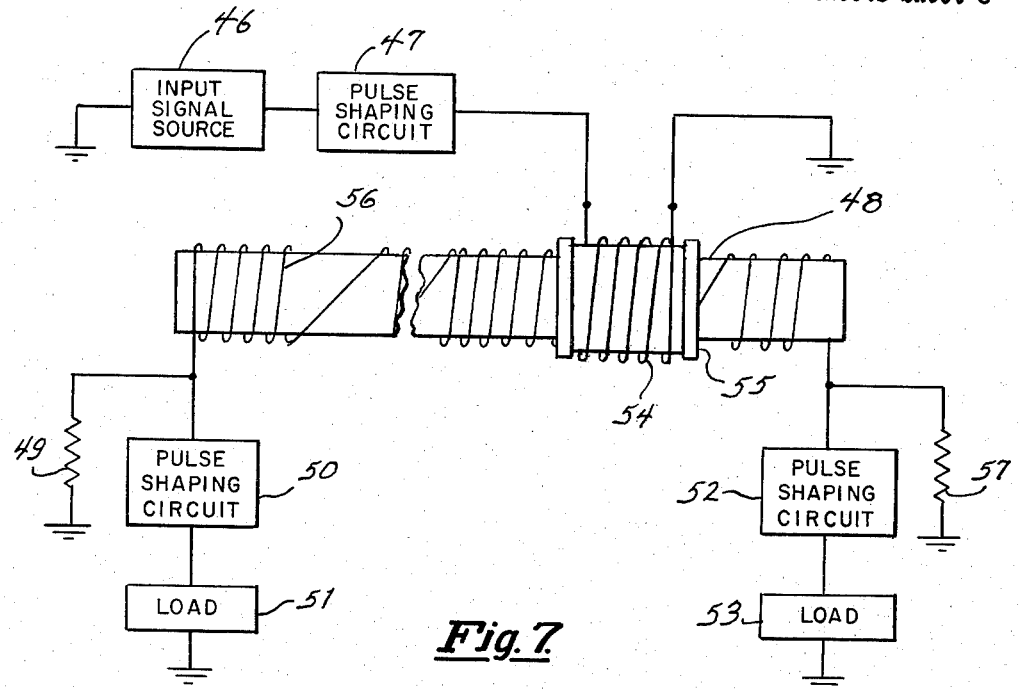
Figure 8:
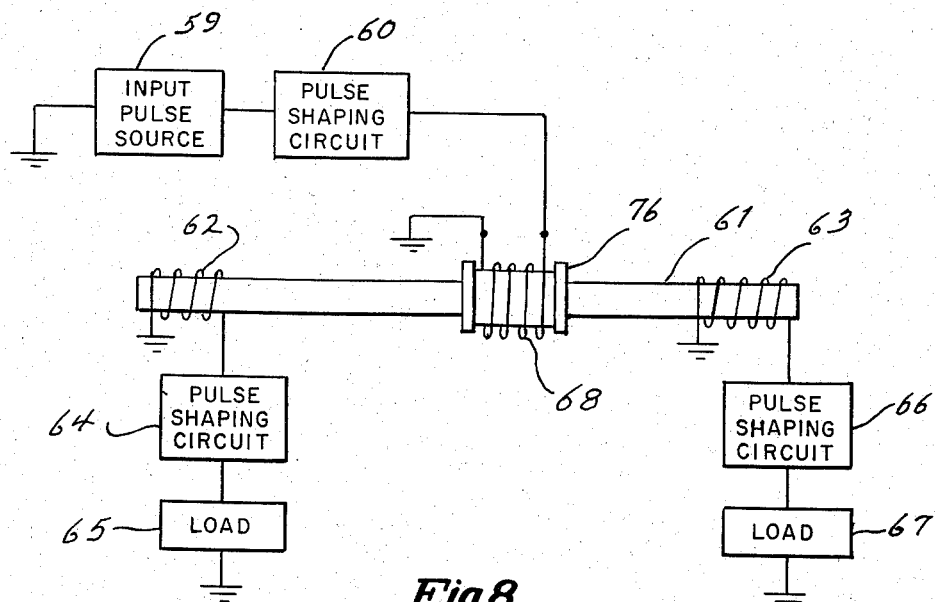

Figs. 4, 5, and 6 show waveforms of output signals produced by the invention when the input winding is positioned at various places along the delay line;

Fig. 7 is a combination block diagram and plan view of another form of the invention; and Fig. 8 is a combination block diagram and plan view of a further form of the invention.

Figure 1:
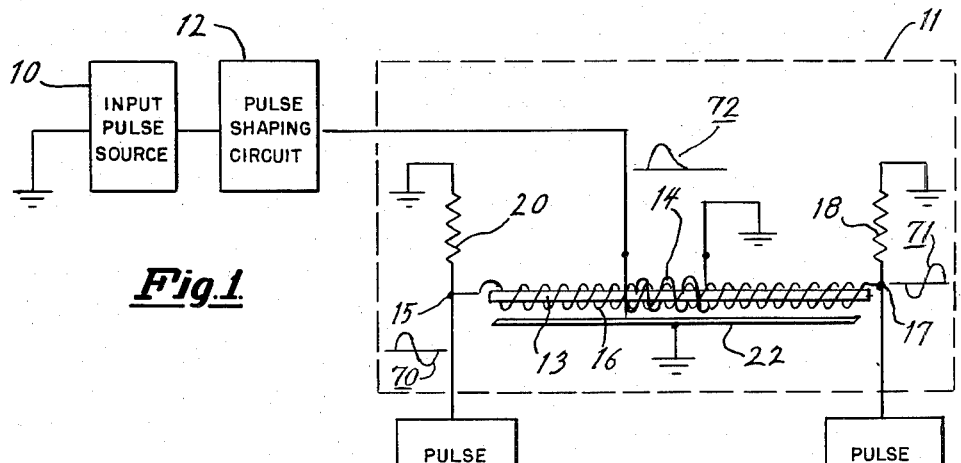
Fig. 1 is a combination schematic sketch and block diagram of the invention.

Referring now to Fig. 1, there is shown a form of the invention employing an electromagnetic type delay line. The input pulse or signal source 10 supplies pulses to the pulse shaping circuit 12 which responds thereto to produce properly shaped pulses which are supplied to the input winding 14 of the delay line 11. The winding 14 is comprised of a number of closely wood turns wound around the longer winding 16. It is to be noted that the winding 14 can be arranged to be movable along the winding 16, thus providing for a continuously variable device. The winding 16 comprises a large number of closely wound turns wound around an elongated insulating core 13. A conductive strip 22 is arranged along the length of the winding 16 and provides a distributed capacitance thereto. Resistors 20 and 18 have values which, when combined with the impedances presented to the winding 16 by the pulse shaping circuits 24 and 26, will produce resultant impedances which are equal to the characteristic impedance of the delay line 11, thus minimizing wave reflection with its consequent distortion. Output pulses or signals are taken from the end terminals 15 and 17 of the winding 16 and are supplied respectively to the utilization means 32 and 34, respectively, through the pulse shaping circuits 24 and 26. The output pulses appearing at the output terminals 15 and 17 of the winding 16, as a result of a unilateral input pulse 72 (Fig. 1) supplied to winding 14, will have waveforms such as are identified by reference characters 70 and 71. The shape of the waveforms 70 and 71 is due to the differentiating effect of the delay line. Further, it will be noted the waveforms 70 and 71 are of opposite polarity. The pulse shaping circuits 24 and 26 function to respond to the signals represented by the waveforms 70 and 71 to produce at terminals 74 and 75 unilateral signals having waveforms, as shown in Figs. 4, 5, and 6, which will be described in detail later. In the following discussion the output signals of the delay line will be regarded as being the signals appearing at the terminals 74 and 75, since such signals are the signals which are actually supplied to a load and, further, since no appreciable time delay is introduced into such signals by the pulse shaping circuits 24 and 26.

Figure 3:
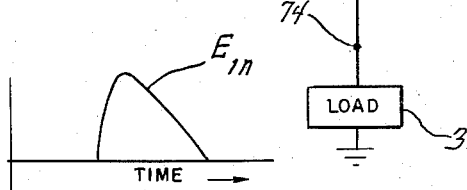
Fig. 3 is a waveform of an input pulse supplied to the structure of Fig. 1.

In operation, the amount of time delay introduced into the signals appearing at the terminals 74 and 75 will vary in an inverse relationship depending upon the position of the input coil 14. For example, as the winding 14 is moved towards the end terminal 17, the time delay of the signal appearing at the terminal 75 will be decreased and the time delay of the signal appearing at the terminal 74 will be increased. Conversely, if the winding 14 is moved towards the end terminal 15, the time delay of the signal appearing at the terminal 75 will be increased and the time delay of the signal appearing at the terminal 74 will be decreased. This inverse relationship in time delays can be seen more clearly from the curves of Figs. 3, 4, 5, and 6, which illustrate waveforms of a typical input pulse (Fig. 3) and the resultant output pulses which will appear at the terminals 74 and 75 (Figs. 4, 5, and 6). More specifically, Fig. 3 illustrates the waveform of the original pulse supplied to the winding 14 from the pulse shaping circuit 12. Fig. 4 shows the waveforms $E_{74}$ and $E_{75}$ of the signal pulses appearing at the terminals 74 and 75, respectively when the winding 14 is positioned substantially at the center of the winding 16. It will be observed that the waveforms $E_{74}$ and $E_{75}$ substantially coincide. In Fig. 5 there are shown the waveforms $E'_{74}$ and $E'_{75}$ which represent the signals appearing at the terminals 74 and 75 when the winding 14 is positioned to the right of the center of the winding 16. It will be observed that the time delay of the pulse $E'_{75}$ is less than that of the pulse $E'_{74}$, since the distance from the winding 14 to the end terminal 17 is less than the distance from the winding 14 to the end terminal 15. In Fig. 6 there are shown the waveforms $E''_{74}$ and $E''_{75}$, which represent the signals appearing at the terminals 74 and 75 when the winding 14 is positioned to the left of the center position of the winding 16. It will be observed that under these conditions the time delay of the pulse represented by the waveform $E''_{74}$ is less than the time delay of the pulse represented by the waveform $E''_{75}$.

Figure 2:
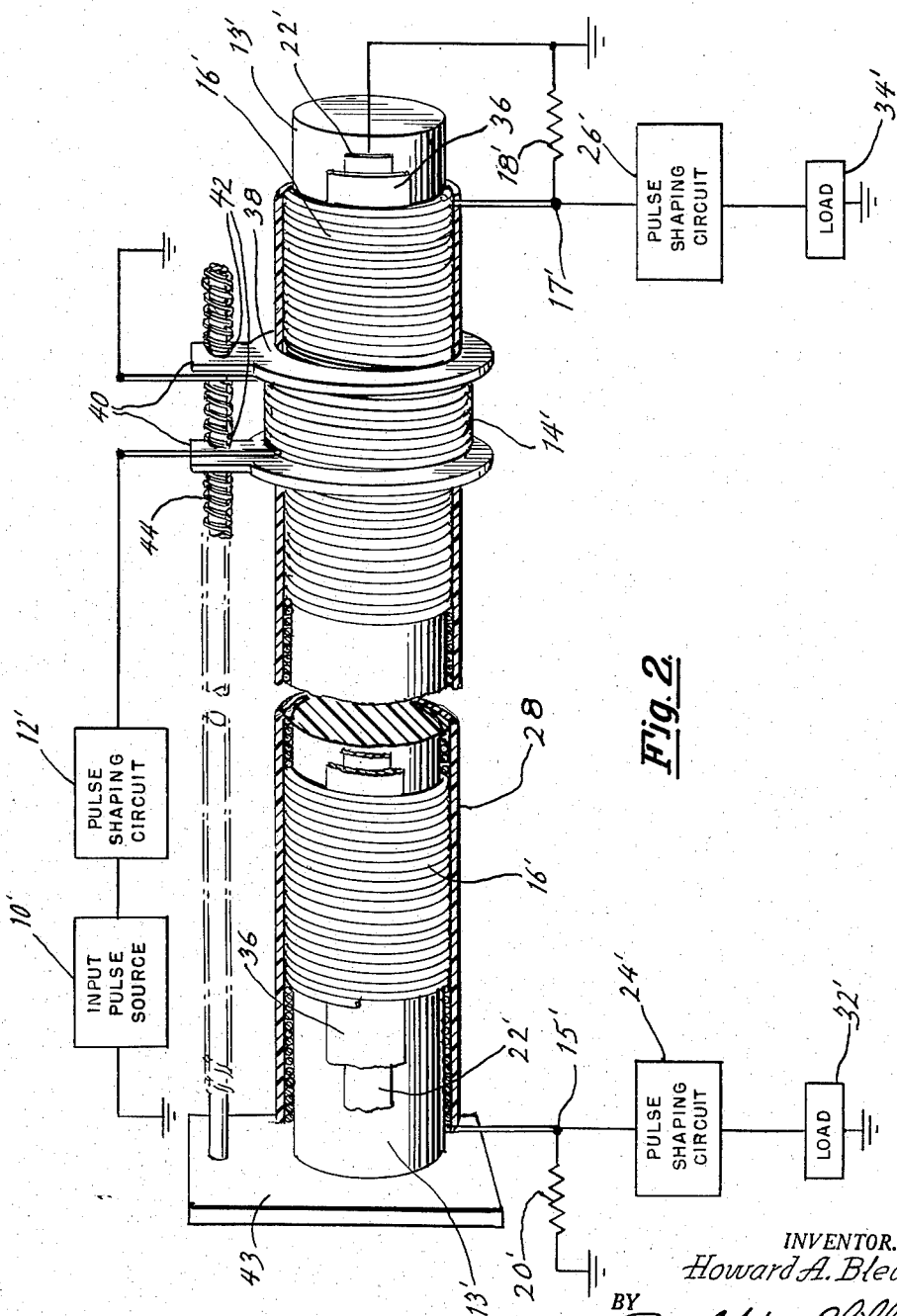
Fig. 2 is a combination circuit diagram and perspective view of a form of the invention shown in Fig. 1.

Referring now to Fig. 2, there is shown a specific construction of the invention. Elements having corresponding elements in the structure of Fig. 1 have been given the same reference characters (primed). The input pulse source 10' supplies pulses to the pulse shaping circuit 12', which is responsive thereto to produce pulses of a proper shape and magnitude which are supplied to the winding 14'. The winding 16' is wound upon the elongated core 13', which is of an insulating material. A protective shield 28 of an insulating material may be positioned around the winding 16'. Conductive strip 22' is arranged between the core 13' and the insulator strip 36, which insulates the conductive strip 22' from the winding 16'. One end terminal 15' of the winding 16' is connected to ground potential through impedance matching resistor 20'. The series-arrangement of the pulse shaping circuit 24' and the utilization means 32 is connected across the resistor 20'. A similar circuit arrangement is employed to derive signal pulses from the other terminal 17' of the winding 16'. This similar circuit arrangement comprises the impedance matching resistor 18', the pulse shaping circuit 26', and the load 34'.

The winding 14' is wound upon the spool 38 which has two lips 40 formed thereon. These two lips have threaded holes 42 therein through which a threaded shaft 44 is passed. The threaded shaft 44 is secured in an aperture in the bracket 43 in such a manner that the shaft 44 can be rotated but cannot move along the direction of its axis. The bracket 43 can be securely fastened with respect to the insulator rod 13'. Thus the position of the spool 38 along the winding 16' is controlled by rotating the shaft 44.

Referring now to Fig. 7, there is shown another embodiment of the invention employing a lumped constant type delay line, identified generally by the reference character 48.

Input signals are supplied to the input winding 54 from the input signal source 46 through the pulse shaping circuit 47. The input winding 54 may be mounted upon some means such as the spool 55 to enable the moving of the winding 54 along the delay line 48.

The output signals from the end terminals of the winding 56 are supplied to the loads 51 and 53 through the pulse shaping circuits 50 and 52, respectively. The resistors 49 and 57, in combination with the impedance presented to the delay line by the pulse shaping circuits 50 and 52, function to provide a matching impedance for the delay line. For a more detailed description of the operation and the structure of a lumped constant-type delay, reference is made to United States Patent No. 2,727,213, issued December 13, 1955, to J. J. Lucas, and which is hereby incorporated as a part of this specification.

Referring now to Fig. 8, there is shown another embodiment of the invention employing a delay line of magnetostrictive material. Input signals are supplied from the input pulse source 59 to the input winding 68 through the pulse shaping circuit 60. The winding 68 is wound around the magnetostrictive rod 61 in such a manner that it can be moved along the rod 61 either to the right or to the left in Fig. 8. Specifically, this may be accomplished by winding the winding 68 upon a spool 76, which fits over the rod 61.

The pulses supplied to the winding 68 will produce a sonic wave in the rod 61, which will travel toward both ends of the rod 61. Accompanying this sonic wave will be a changing magnetic flux field as is characteristic of magnetostrictive material. Output signals will be produced in the output windings 62 and 63 by these changing magnetic fields. These output signals are supplied from the output windings 62 and 63 to the utilization means 65 and 67 through the pulse shaping circuits 64 and 66. The amount of delay time introduced into the signals supplied to the utilization means 65 or 67 will vary in an inverse manner, in accordance with the position of the winding 68 along the delay line 61. Movement of the winding 68 to the left in Fig. 8 will increase the delay time of the signal supplied to the load 67 and decrease the delay time of the signal supplied to the load 65. Conversely, moving the winding 68 to the right will decrease the delay time of the signal supplied to the load 67 and will increase the delay time of the signal supplied to the load 65.

It is to be noted that the forms of the invention shown and described herein are but preferred embodiments of the same and that various changes may be made in the structures and in the circuits without departing from the spirit or scope of the invention.

I claim:
1. Means for controlling the relative timing of energization of a pair of pulse triggered utilization devices comprising in combination: a source of control pulses; delay line means; input means connected to said source of control pulses and inductively coupled to said delay line means for introducing said control pulses into said delay line means; means for adjustably positioning said input means intermediate the ends of said delay line means to thereby vary the relative delay between the control pulses and the respectively induced pulses appearing at the respective ends of said delay line means; and pulse shaping means individually interposed between respective ends of said delay line means and corresponding ones of said utilization devices for delivering trigger pulses thereto in response to induced pulses reaching said respective ends of said delay line means.

2. Means for controlling as set forth in claim 1 wherein said delay line means includes a relatively long winding and wherein said input means includes a relatively short winding, both said windings being in inductive relationship with each other.

3. Means for controlling as set forth in claim 1 wherein said delay line means comprises a delay line of the lumped constant type.

4. Means for controlling the relative timing of energization of a pair of pulse triggered utilization devices comprising in combination: a source of input pulses; a magnetostrictive delay line; an input winding inductively coupled to said delay line and adapted for movement between the ends thereof; said input winding connected to said source of input pulses for introducing magnetostrictive disturbances into said delay line in response to said input pulses; means for moving said input winding to any desired point intermediate the ends of said delay line; means coupled between respective ends of said delay line and corresponding ones of said utilization devices for delivering properly shaped and polarized pulses to said pulse triggered utilization devices in response to said magnetostrictive disturbances, the relative timing of energization of said utilization devices being determined by the distance differential existing between the respective ends of said delay line and said input winding.

References Cited in the file of this patent

UNITED STATES PATENTS

| | | |
|---|---|---|
| 1,456,909 | Pupin | May 29, 1923 |
| 2,145,332 | Bedford | Jan. 31, 1939 |
| 2,549,578 | Curtis | Apr. 17, 1951 |
| 2,559,905 | Turner | July 10, 1951 |
| 2,727,213 | Lucas | Dec. 13, 1955 |
| 2,736,881 | Booth | Feb. 28, 1956 |
| 2,772,399 | Jacobsen | Nov. 27, 1956 |

FOREIGN PATENTS

| | | |
|---|---|---|
| 112,749 | Australia | Apr. 3, 1941 |